(12) United States Patent
Miller et al.

(10) Patent No.: US 9,166,630 B1
(45) Date of Patent: Oct. 20, 2015

(54) ADAPTIVE RADIO COMMUNICATIONS SYSTEMS AND METHODS

(71) Applicant: Raytheon Company, Waltham, MA (US)

(72) Inventors: Kenneth V. Miller, Rancho Cucamonga, CA (US); Paul R. Work, Bristol, RI (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/337,521

(22) Filed: Jul. 22, 2014

(51) Int. Cl.
| H04B 1/06 | (2006.01) |
| H04B 1/00 | (2006.01) |
| H04B 1/38 | (2015.01) |
| H04B 1/707 | (2011.01) |

(52) U.S. Cl.
CPC .............. *H04B 1/0014* (2013.01); *H04B 1/38* (2013.01); *H04B 1/707* (2013.01)

(58) Field of Classification Search
CPC .... H04B 1/0003; H04B 1/0007; H04B 1/001; H04B 1/0014; H04B 1/0017; H04B 1/0028; H04B 1/0032; H04B 1/0035; H04B 1/0039; H04B 1/0042

USPC ......... 375/316, 259, 260, 267, 340, 346, 347, 375/349

See application file for complete search history.

(56) References Cited

U.S. PATENT DOCUMENTS

| 6,009,130 | A | * | 12/1999 | Lurey et al. ................... 375/347 |
| 6,167,099 | A | * | 12/2000 | Rader et al. ................... 375/347 |
| 6,205,133 | B1 | * | 3/2001 | Bexten .......................... 370/343 |
| 6,297,701 | B1 | * | 10/2001 | Visocchi et al. .............. 330/308 |
| 6,914,950 | B1 | * | 7/2005 | Luneau ......................... 375/347 |
| 7,203,488 | B2 | * | 4/2007 | Luneau ...................... 455/422.1 |
| 7,831,255 | B1 | * | 11/2010 | Gribble et al. ................ 455/450 |
| 8,837,640 | B2 | * | 9/2014 | Picard .......................... 375/340 |
| 2006/0107318 | A1 | * | 5/2006 | Jeffries et al. .................. 726/22 |

* cited by examiner

*Primary Examiner* — Siu Lee
(74) *Attorney, Agent, or Firm* — Daly, Crowley, Mofford & Durkee, LLP (57) ABSTRACT

An illustrative adaptive radio communications system comprises a cluster of waveform and application processor entities coupled and a plurality of transceivers. The transceivers convert radio frequency (RF) signals into digital in-phase and quadrature (I/Q) data, which is sent to the waveform processor entities via a network fabric. The waveform processor entities perform low-level waveform processing and the application processor entities perform high-level, distributed signal processing. The system and related methods are capable of processing multiple programmable waveforms of varying complexity.

20 Claims, 4 Drawing Sheets

ADAPTIVE RADIO COMMUNICATIONS SYSTEMS AND METHODS

BACKGROUND

As is known in the art, a computer cluster (or "cluster") comprises a set of connected computers that work together so that, in many respects, they can be viewed as a single system. The components of a cluster are typically connected to each other through fast local area networks (LANs), with each "node" (i.e., a computer used as a server) running its own instance of an operating system. Clusters are usually deployed to improve performance and availability compared to a single computer, while typically being more cost-effective than single computers of comparable speed or availability. Using off-the-self software clustering and distributed processing software, high-performance computing can be achieved using conventional hardware.

As is also known, software-defined radios (SDR) typically combine specialized hardware with waveform processing software (typically referred to as "waveform applications" or "waveforms") to provide the flexibility to receive and transmit widely different radio protocols based solely on the software used.

SUMMARY

It is appreciated herein that SDRs use field-programmable gate arrays (FPGAs), application-specific integrated circuits (ASICs), or other specialized hardware. Thus, SDRs use a monolithic, stove-piped design limited in terms of processing power and availability and may be unable to handle increasingly complex waveforms. Therefore, it would be desirable to provide a radio communications system wherein waveform processing is defined within software and wherein generally system resources (e.g., transceivers, processors, and storage) can be scaled/expanded dynamically to handle increasingly complex waveforms.

In one aspect, a radio frequency (RF) communications system comprises a plurality of transceivers to receive RF signals and to convert the RF signals to digital in-phase and quadrature (I/Q) data representative of the received RF signals; a plurality of waveform processor entities operatively coupled to receive the I/Q data from the plurality of transceivers via a network fabric (e.g., an Ethernet Fabric network) and to perform digital signal processing on the received I/Q data; and grid-computing module to determine which of the plurality of waveform processor entities receives and processes the I/Q data.

In embodiments, the plurality waveform processor entities demodulate the received I/Q data to generate demodulated data. The system may further comprise an application processor entity operatively coupled to receive at least a portion of the demodulated data from two or more of the plurality of waveform processor entities, to aggregate the received demodulated data, and to perform signal processing on the aggregated demodulated data. The application processor entity may be one of a plurality of application processor entities selected by the grid-computing module to receive and process the demodulated data. In embodiments, the application processor entity correlates the demodulated data in time to perform wideband signal processing. In some embodiments, the application processor entity aggregates data representative of RF signals received in a first band (i.e., by a first transceiver) and data representative of RF signals received in a second band (i.e., by a second transceiver) to process a spread spectrum signal.

In embodiments, the system further comprises a network storage device, wherein one or more of the plurality of waveform processor entities send the demodulated data to the network storage device, and wherein the application processor entity receives at least a portion of the demodulated data from the network storage device.

In embodiments, the system further comprises a time synchronization server operatively coupled to synchronize clocks within the plurality of transceivers and waveform processor entities. The time synchronization server may comprise a Global Positioning System (GPS)-based time synchronization module or a rubidium standard clock.

According to another aspect, a method comprises receiving RF signals at a plurality of transceivers; converting the RF signals to digital in-phase and quadrature (I/Q) data representative of the received RF signals; selecting, from a plurality of waveform processor entities, one or more waveform processor entities to perform digital signal processing on the I/Q data; sending the FQ data from the plurality of transceivers to the selected waveform processor entities via a network fabric (e.g., an Ethernet Fabric network); receiving the I/Q data at the selected waveform processor entities; and performing digital signal processing on the received I/Q data.

In embodiments, the method further comprises demodulating the received I/Q data to generate demodulated data; sending the demodulated data from the selected waveform processor entities to an application processor entity via the network fabric; receiving, at the application processor entity, at least a portion of the demodulated data generated by two or more of the selected waveform processor entities; aggregating the received demodulated data; and performing signal processing on the aggregated demodulated data. The method may further comprise sending the demodulated data from the selected waveform processor entities to a network storage device via the network fabric; and receiving, at the application processor entity, at least a portion of the demodulated data from the network storage device via the network fabric. In embodiments, the application processor entity is selected from a plurality of application processor entities using grid-computing techniques. The application processor entity may correlate the demodulated data corresponding to one or more RF bands in time to perform wideband signal processing (e.g., spread spectrum).

BRIEF DESCRIPTION OF THE DRAWINGS

The systems and techniques sought to be protected herein may be more fully understood from the following detailed description of the drawings, in which.

The drawings are not necessarily to scale, or inclusive of all elements of a system, emphasis instead generally being placed upon illustrating the concepts, principles, systems, and techniques sought to be protected herein.

DETAILED DESCRIPTION

Figure 1:
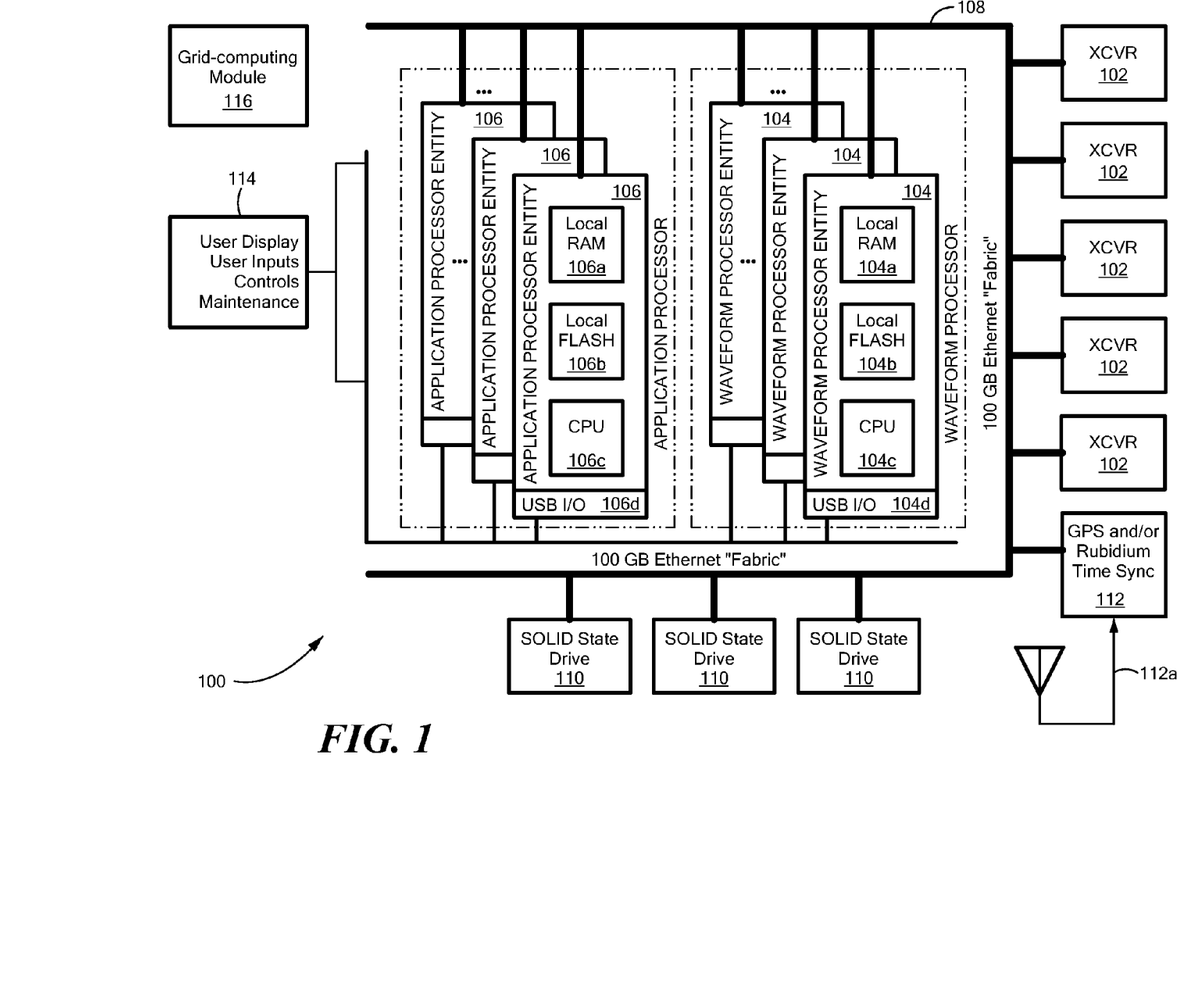
FIG. 1 is a block diagram of an illustrative adaptive radio system.

Referring to FIG. 1, an illustrative adaptive radio communications system ("communications system") 100 includes a plurality of transceivers 102, a plurality of waveform processor entities 104, and one or more application processor entities 106 (collectively referred to as "system components"). The communications system 100 may also include one or more network storage devices 110 and/or a time synchronization ("sync") server 112 (also referred to as "system components"). The various system components are coupled together via a network fabric 108. It should be understood that the system may include generally any number of transceivers, waveform processors, application processors, and/or storage devices.

Figure 2:
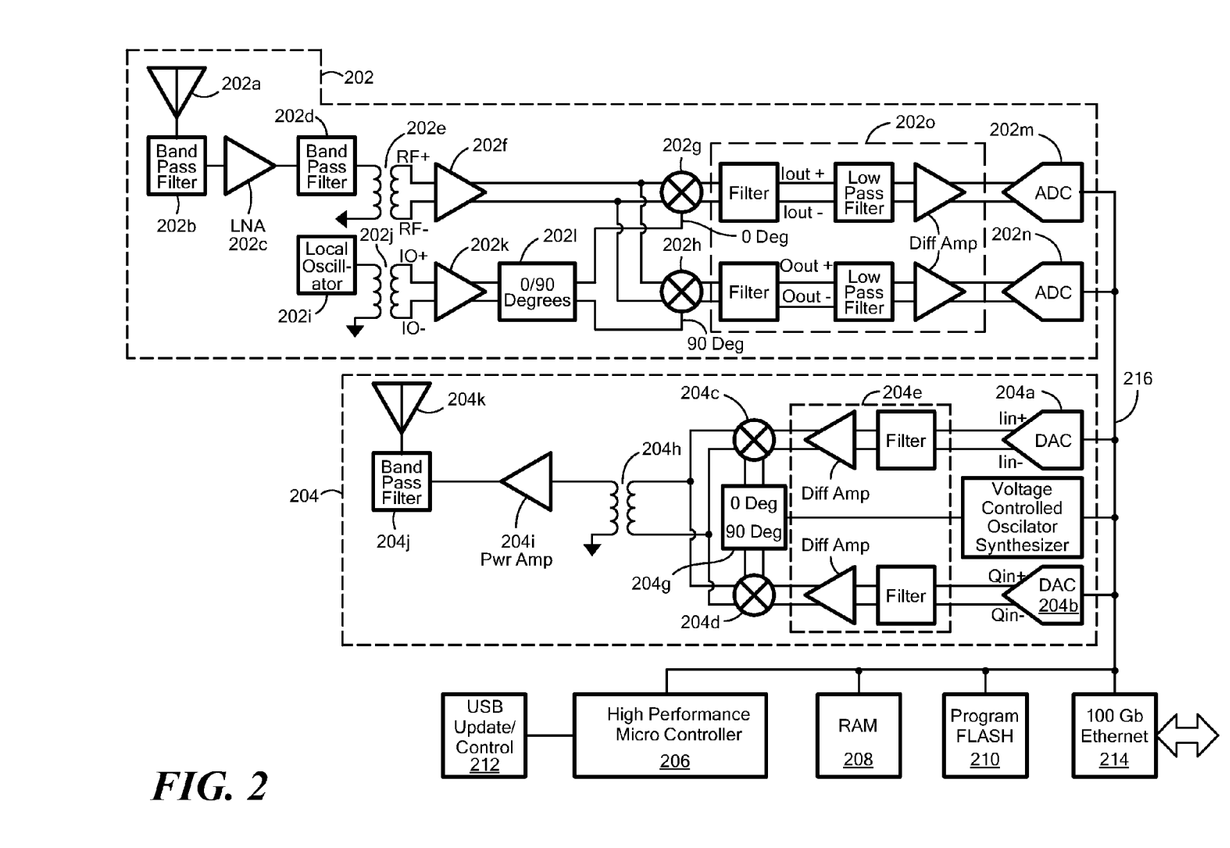
FIG. 2 is a schematic representation of an illustrative transceiver for use in the system of FIG. 1.

An illustrative transceiver 102 comprises a radio receiver to receive RF signals (e.g., via free space), to convert the RF signals into digital in-phase and quadrature (I/Q) data, and to make the I/Q data available to the waveform processor entities 104 and/or the application processor entities 106 (via the network fabric 108). In embodiments, an illustrative transceiver 102 further comprises a radio transmitter to receive digital I/Q data via the network fabric 108, convert the I/Q data to RF signals, and transmit the RF signals (e.g., into free space). An example of a transceiver is illustrated in FIG. 2 and described below in connection therewith.

An illustrative waveform processor entity 104 includes a memory 104a, local storage 104b, and a central processing unit (CPU) 104c. In embodiments, the illustrative waveform processor entity 104 comprises a general-purpose computer running the Linux operating system (OS). In some embodiments, the illustrative waveform processor entity 104 comprises a BeagleBone Linux computer designed by the BeagleBoard.org Foundation, a U.S.-based non-profit corporation having a place of business in Richardson, Tex. In embodiments, the local storage 104b comprises flash memory. In embodiments, the illustrative waveform processor entity 104 includes Red Hat Enterprise Linux, Version 6 or greater. In some embodiments, the waveform processor entity 104 includes a Universal Serial Bus (USB) interface 104d for management and control (e.g., used to update software stored within the local storage 104b). The waveform process entity 104 may also include a network fabric adapter (not shown) to send/receive to/from the network fabric 108.

The waveform processor entities 104 are configured to perform digital signal processing (DSP). In embodiments, the DSP is defined within software (referred to herein as "waveform processing software"). Thus, it will be appreciated that the waveform processor entities 104 (and the application processor entities 106) need not include specialized hardware, such as field-programmable gate arrays (FPGAs) or application-specific integrated circuits (ASICs) for DSP. It will be appreciated, however, that a portion of the DSP can be performed by an FPGA and/or an ASIC. In embodiments, the waveform processing software can be modified dynamically (e.g., an administrator may install software via a USB interface 104d). It should be understood that the systems and concepts sought to be protected herein are not limited to any particular signal processing techniques.

An illustrative application processor entity 106 is similar to the illustrative waveform processor entity 104 described hereinabove, with certain similarities and differences discussed herein. The application processor entity includes a memory 106a, local storage 106b, a CPU 106c, and (in some embodiments) a USB interface 106d; which may be similar to the waveform processor entity memory 104a, local storage 104b, CPU 104c, and USB interface 104d, respectively. The illustrative application processor entity 106 may also include a network fabric adapter (not shown) to send/receive to/from the network fabric 108.

The application processor entities 106 are configured to perform DSP. In embodiments, the DSP is defined within software (referred to as "application processing software") although it will be understood that portions of the DSP may also be performed using an FPGA and/or an ASIC. In embodiments, the application processing software can be modified dynamically (e.g., an administrator may install software via a USB interface 106d). Whereas the waveform processor entities 104 generally perform "low-level" signal process techniques (e.g., demodulation), the application processor entities 106 generally perform "high-level" signal processing techniques. For example, in embodiments, an application processor entity 106 correlates and aggregates data from a plurality of transceivers to receive a signal deliberately spread across multiple frequency bands (i.e., a spread spectrum signal). Other non-limiting examples of application processor techniques include: enabling diversity reception to reduce (and ideally eliminate) selective fading and other propagation anomalies; operating as an interferometer; acting as a phased array for enhanced gain and/or directivity; and providing signal detection and correlation in the performance of signals intelligence work.

The network fabric 108 comprises a plurality of data links to allow data transfer between the various system components. In embodiments, the network links comprise gigabit Ethernet links, such as fiber optic links. In embodiments, the network fabric 108 comprises an Ethernet Fabric network. Thus, the system components may be directly linked (i.e., point-to-point), or indirectly linked via one or more switches (e.g., fabric switches).

The network storage devices 110 are used by the other system components to store and retrieve data via the network fabric 108. In embodiments, an illustrative network storage device 110 comprises one or more services and corresponding application programming interfaces (APIs) or protocols. In embodiments, the network storage device 110 comprises a solid-state drive (SSD) or other type of non-volatile storage. In embodiments, the network storage device 110 further comprises a microcontroller and a network fabric adapter. As used herein, the term "microcontroller" is used to describe a computing device having a processor, a memory, and programmable input/output (I/O). Non-limiting examples of microcontrollers include system on a chips (SoCs) and general-purpose computers. In embodiments, the network storage devices 110 comprise Linux servers. In some embodiments, the radio system includes a storage-area network (SAN) comprising the network storage devices 110 coupled via a fibre channel.

The time sync server 112 provides time synchronization (or "time sync") between the various system components. In some embodiments, the time sync server 112 comprises a network time server and the other system components comprise software to communicate with the time server (i.e., client software). Those skilled in the art will appreciate that network time server-client protocols are known, including protocols that can achieve sub-millisecond accuracy on a local area network (LAN) (e.g., Network Time Protocol (NTP)). It will be understood that time synchronization requirements vary depending on the particular waveform processing being performed (e.g. code pattern synchronization in CDMA or timed key exchanges in cryptographic systems) and, therefore, other suitable protocols may be used; in some cases, the time sync server 112 may be excluded.

In some embodiments, the communications system 100 comprises a wide-area network (WAN) or is coupled to another communications system via a WAN. Therefore, it may be desirable to provide multiple time sync servers 112 such that each (or most) system components are connected to a time sync server 112 via a LAN to avoid high latency and low availability typically associated with a WAN. In such embodiments, the time sync servers 112 may comprise rubidium clocks (i.e., rubidium standard or atomic clocks) and/or Global Positioning System (GPS)-based time synchronization modules to provide accurate time within each of the LANs. GPS-based time synchronization modules are known in the art and may comprise a GPS antenna 112a, as shown.

In embodiments, the communications system 100 is coupled to one or more external systems 114. An illustrative external system 114 includes a user display, a user input, and a processor operatively coupled to allow an operator to perform configuration and maintenance tasks, such as adding resources and uploading waveform software. As another example, an external system 114 includes a user display, a user input, and a processor operatively coupled to allow a user to select waveforms, select frequency bands, and view spectrum display output.

The communications system 100 includes one or more grid-computing modules 116 comprising software (e.g., a middleware) and/or hardware components configured to perform grid-processing techniques known in the art. For simplicity of explanation, only one grid-computing module 116 is shown in FIG. 1; however it should be understood that the system 100 could include several grid-computing modules. Moreover, the grid-computing modules may be provided as software/hardware elements within the other system components (e.g., transceivers, waveform processor entities 104, and/or application processor entities 106).

In embodiments, the grid-computing modules 116 comprise clustering software, such as Red Hate Enterprise Linux® High Availability Add-On, and distributed processing software, such as Red Hat® Enterprise Linux Grid, HTCondor, or other software that provides high-throughput, high-performance, distributed computing within a computer cluster. In one aspect, the system 100 includes (or is part of) a computer cluster wherein one or more of the system components correspond to cluster "nodes" or "resources." More specifically, the waveform and application processor entities 104, 106 correspond to processing resources, and the storage devices 110 correspond to storage resources.

Although features and operations of grid-computing are known to those skilled in the art, a brief overview is given herein. Grid-computing solutions provide job queuing mechanism, scheduling policy, priority schemes, resource monitoring, and resource management. Users can submit jobs to the cluster (e.g., via an external control system 114), which places the jobs into an appropriate queue and chooses when and where to run the jobs based upon required and available resources. A grid-computing module may monitor the progress of each job and inform the user of job completion (e.g., via an external display 114). Computationally expensive jobs can be distributed and performed by multiple resources in parallel (i.e., distributed processing). Resources can be dynamically added and removed without disrupting normal system operation. For example, processor entities 104, 106 can be dynamically added to handle more complex waveforms. In addition, grid-computing software/hardware handles node failures such that the failure of any given node generally does not cause the overall system to fail. In general, any resource can be utilized for any of a number of waveforms simultaneously.

In illustrative embodiments, the communications system 100 can function as a radio receiver and/or a radio transmitter. In receiver operation, the transceivers 102 receive RF signals (e.g., from free space), demodulate the received signals into in-phase and quadrature (I/Q) signals, and convert the I/Q signals into digital form (referred to herein as "I/Q data"). The I/Q data is representative of the received RF signals, meaning that it conveys sufficient information about the received RF signals to allow digital signal processing and analysis to be performed. The transceivers 102 send the I/Q data to the other system components via the network fabric 108.

In embodiments, the transceivers 102 generate and send network data packets comprising the I/Q data. In one embodiment, the network fabric comprises an Ethernet network and the transceivers 102 generate and send Ethernet packets comprising the I/Q data (i.e., the Ethernet packet "frames" or "payloads" comprise the I/Q data).

In one aspect, the I/Q data is a stream of data is converted to blocks of data (i.e., data packets) for transmission through the network. Any suitable framing technique may be used to generate the data packets. In one embodiment, the transceivers 102 use a time-based framing technique whereby the I/Q data is segmented by time periods (e.g., a predetermine constant time period) and each data packet generally corresponds to one time period. For example, each data packet may correspond to N seconds of I/Q data (and, thus, N seconds of received RF signal information). Moreover, multiple transceivers having synchronized clocks (using time sync module 112) can implement a cooperative time-based framing technique whereby data packets generated from each of those receivers generally start and end at common time boundaries. It will be appreciated that this technique allows the processor entities 104, 106 to receive data packets from multiple transceivers and to correlate those data packets in time for wideband signal processing (e.g., processing spread spectrum signals).

An illustrative transceiver 102 determines the destination network node (or nodes) for the sent I/Q data. More specifically, a grid-computing module (e.g., software) within the transceiver determines which processing resources are available to perform waveform processing on the I/Q data and will schedule and load them for execution. In embodiments, the transceiver 102 assigns a corresponding media access control (MAC) destination address to Ethernet packets comprising the I/Q data).

I/Q data is received by one or more waveform processor entity 104 via the network fabric 108. An illustrative waveform processor entity 104 applies its software-defined waveform to the received I/Q data (i.e., the input) to extract information (i.e., the output) from the signal represented by the I/Q data. For example, a waveform processor entity 104 may demodulate a carrier frequency audio signal to generate a baseband audio signal. As another example, a waveform processor entity 104 may perform digital modulation (e.g., phase-shift keying) to extract digital information form a signal. In embodiments, a waveform processor entity 104 may use a Fast Fourier Transform (FFT) technique to demodulate a signal. The output (referred to herein as "demodulated data") is sent into the network fabric 108 or to an external device. The demodulated data may be encapsulated and sent within Ethernet packets.

An illustrative waveform processor entity 104 determines the destination network node (or nodes) for the sent demodulated data using the same or similar techniques used by the transceivers 102 (as described above). The waveform processor entity 104 may determine the demodulated data should be stored within the network storage devices 110 or should be processed directly/immediately by selected application processor entities 106.

The demodulated data is received (via the network fabric 108) by one or more application processor entities 106. The data may be received directly from the waveform processor entities 106 or may be retrieved from the network storage devices 110. Thus, the application processor entities 106 may operate in a "real-time" mode or in an "offline" mode. An illustrative application processor entity 106 applies its software-defined application processing to the received demodulated data (i.e., the input) and generates output. The type of output depends on the particular application processing software. In some embodiments, an application processor entity 106 generates a high-level user report, which is stored in the network storage devices (via the network fabric 108) and accessible by a user display 114. Other non-limiting examples of application processor entity 106 output include demodulated waveform ready for processing/distribution and a waterfall spectrum display.

In embodiments, an illustrative application processor entity 106 performs aggregate signal processing of demodulated data earlier processed by multiple different waveform processor entities 104 and stored in the network storage devices 110.

The communications system 100 may also function as a radio transmitter. In transmit operation, waveforms are presented to the applications processor entities 106, which in turn distribute processing work to the waveform processor entities 104 so that appropriate modulation/timing can be created and/or added. The output of the waveform processor entities 104 is sent to appropriate transceivers 102, which use this information to generate an RF waveform for transmission. In some embodiments, additional information, such as stored frequency sequences, encoding information, and/or buffering information may be retrieved from the storage devices 110 by the processor entities and and/or by the transceivers.

It should be appreciated that the illustrative communications system 100 provides a flexible architecture wherein the various system components (i.e., transceivers, processor entities, and network storage devices) can be dynamically allocated and configured to achieve high-performance, adaptive radio communications. For example, to receive and process a wideband spread spectrum signal, the system 100 may allocate a plurality of transceivers each configured to receive in a narrowband (i.e., a portion of the wideband); a plurality of waveform processor entities configured to perform distributed demodulation on the narrowband data; and a relatively small number (e.g., one) of application processor entities configured to aggregate the demodulated narrowband data to perform wideband signal processing. Thus, the communications system 100 can be used for low-probability of detection (LPD) communication by "hiding" information with commonly used radio waveforms, such as time division multiple access (TDMA) or code division multiple access (CDMA).

In one embodiment, one or more of the processor entities 104, 106 and/or transceivers 102 are disposed upon a common substrate using, for example, multi-chip module (MCM) packaging. In embodiments, the system 100 is provided within (or comprises) a mechanically rugged case.

Referring now to FIG. 2, an illustrative transceiver 200 may be the same as or similar to a transceiver 102 within the communications system 100 of FIG. 1. The transceiver 200 includes a radio receiver 202, a radio transmitter 204, a microcontroller 206, a memory 208, and a local storage module 210. The illustrative transceiver 200 further includes a network fabric adapter 214 to send/receive to/from the network fabric 108 (FIG. 1). In some embodiments, the transceiver 200 includes a USB interface 212 for management and control (e.g., to update software stored within the local storage 210). In embodiments, the local storage 210 comprises flash memory. The various transceiver components 202-214 are coupled together by a computer bus 216 (or a plurality of interconnected computer buses). In embodiments, the bus 216 utilizes Ethernet fabric or fibre.

In some embodiments, the transceiver 200 comprises a general-purpose computer and the microcontroller 206, memory 208, local storage 210, USB interface 212, and/or network adapter 214 may be provided as part of the computer. The computer may be a BeagleBone running Red Hat Enterprise Linux, Version 6 or greater and my include grid-computing software (e.g., a middleware). In some embodiments, the receiver 202 and transmitter 204 are provided on separate boards that interface with the general-purpose computer. In embodiments, the receiver 202 and transmitter 204 are provided on provided as MCMs on a shared substrate.

The illustrative radio receiver 202 comprises a receive antenna 202a coupled to a first band-pass filter 202b, and a second band-pass filter 202d coupled to the first band pass filter via a low-noise amplifier (LNA) 202c. The second band-pass filter 202d is operatively coupled to a first differential amplifier 202f via a first transformer 202e, and the first differential amplifier 202f is coupled to a first mixer 202g and a second mixer 202h, as shown. The receiver 202 further comprises a local oscillator 202i and a second differential amplifier 202k operatively coupled via a second transformer 202j. The second differential amplifier 202k output is coupled to a splitter 202l having a 0-degree output coupled to the first mixer 202g and a 90-degree output coupled to the second mixer 202h. The first mixer 202g output is coupled to a first analog-to-digital converter (ADC) 202m and the second mixer 202h output is coupled to a second ADC 202n. In embodiments, the mixers and ADCs are coupled via one or more filters and/or amplifiers (generally indicated as 202o in FIG. 2).

Although the operation of the illustrative receiver circuit 202 shown in FIG. 2 will be known to those skilled in the art, a brief overview is given herein. An RF signal is received at the antenna 202a and filtered by the first band pass filter 202b to produces a corresponding band pass signal. The band pass signal is amplified by the LNA 202c having a suitable gain and again filtered by operation of the second band pass filter 202d. The first and second band pass filters are tuned to a desired frequency band. The band pass signal is received as input to both mixers 202g, 202h, with the first transformer 202e and differential amplifier 202f providing isolation protection and impedance matching between band pass filter 202d and the mixer 202g.

The local oscillator 202i generates a sinusoidal signal having a selected demodulation frequency. The second transformer 202j and second differential amplifier 202k provide isolation protection and impedance matching between the local oscillator 202i and other circuit elements. The splitter 202l splits the sinusoidal signal into corresponding real and imaginary signals (i.e., two sinusoidal signals with a 90-degree phase difference), which are received as input to the first mixer 202g and second mixer 202h, respectively. Thus, the first mixer 202g generates an in-phase down-mixed signal and the second mixer 202h generates a quadrature down-mixed signal. The filters 202o remove negative frequency spectrum and noise outside the desired bandwidth. The resulting in-phase and quadrature down-mixed signals are received by the first ADC 202m and second ADC 202n, respectively.

The ADCs 202m, 202n convert the (analog) down-mixed signals to a representative digital form ("I/Q data"). The ADCs sample and quantize the data using techniques known in the art. In embodiments, the ADCs sample above the Nyquist frequency to avoid loss of information. The ADCs may further prepare the data for transmission through a network (e.g., frame the data, generate Ethernet packets, etc.) as described further above in connection with FIG. 1.

The ADCs 202m, 202n are coupled to the microcontroller 206 via the computer bus 216. Thus, the microcontroller 206 can receive I/Q data from the receiver and generate corresponding network data for sending into the network fabric (via the network adapter 214). In embodiments, the bus 216 comprises a plurality of signal paths (i.e., it is a parallel bus) and the microcontroller receives the in-phase and quadrature data in parallel. In embodiments, the microcontroller is configured (e.g., uses program software stored within the local storage module 210) to generate Ethernet packets comprising the I/Q data, and to send the Ethernet packets into the network fabric 108 via the network adapter (i.e., an Ethernet adapter) 214. As discussed above, the microcontroller may be configured to perform time-based packet framing whereby the UQ data is segmented by time periods.

Those skilled in the art will understand that, in response to receiving RF signals via the receive antenna 202a, the illustrative receiver 202 generates representative I/Q data, which can be received and processed by the microcontroller 206. Moreover, those skilled in the art will appreciate that the concepts and techniques sought to be protected herein are not limited to the receiver illustrated in FIG. 2 and that other receiver designs can be used.

The illustrative radio transmitter 204 includes a first digital-to-analog converter (DAC) 204a and a second DAC 204b coupled to receive digital in-phase data and digital quadrature data, respectively, from the microcontroller 206. In embodiments, the microcontroller 206 receives network packets comprising UQ data from the network fabric 108 (via the network adapter 214) and sends the corresponding in-phase data to the first DAC 204a and the corresponding quadrature data to the second DAC 204b. In embodiments, the transmitter 204 is coupled to the microcontroller 206 via a parallel interface (e.g., the bus 216 may be a parallel bus) and, thus, the microcontroller can send data to both of the DACs in parallel.

The transmitter 204 further includes a first mixer 204c coupled to the first DAC 204a and a second mixer 204d coupled to the second DAC 202b via filters 204e. A voltage-controller oscillator (VCO) 204f is coupled to a splitter 204g having a 0-degree output coupled to the first mixer 204d and a 90-degree output coupled to the second mixer 204d. The mixers 204c, 204d are both coupled to an amplifier 204i via a transformer 204h. The amplifier 204i, in turn, is coupled to a transmit antenna 204k via a band pass filter 204j. In embodiments, the transmit antenna 204k and the receive antenna 202a comprise a common physical antenna structure.

In operation, the first DAC 204a receives digital in-phase data and generates a representative (analog) in-phase signal, which is provided as input to the first mixer 204c. Likewise, the second DAC 204b receives corresponding digital quadrature data and generates a representative (analog) quadrature signal, which is provided as input to the second mixer 204d. The VCO 204f generates a sinusoidal signal having a selected modulation frequency, which is split into real and imaginary signals by the splitter 204g. The first mixer 204c multiples the real signal by the in-phase signal and the second mixer 204d multiples the imaginary signal by the quadrature signal. The resulting mixed signals are combined to produce a band pass signal. The band pass signal is amplified by the amplifier 204i having a suitable gain, filtered by the band pass filter 204j, and transmitted via the transmit antenna 204k (e.g., into free space)

Those skilled in the art will understand that, in response to receiving digital I/Q data from the microcontroller 206, the illustrative transmitter 204 generates and transmits a representative RF signal via the antenna 204k. Moreover, those skilled in the art will appreciate that the concepts and techniques sought to be protected herein are not limited to the transmitter illustrated in FIG. 2 and that other transmitter designs can be used.

Figure 3:
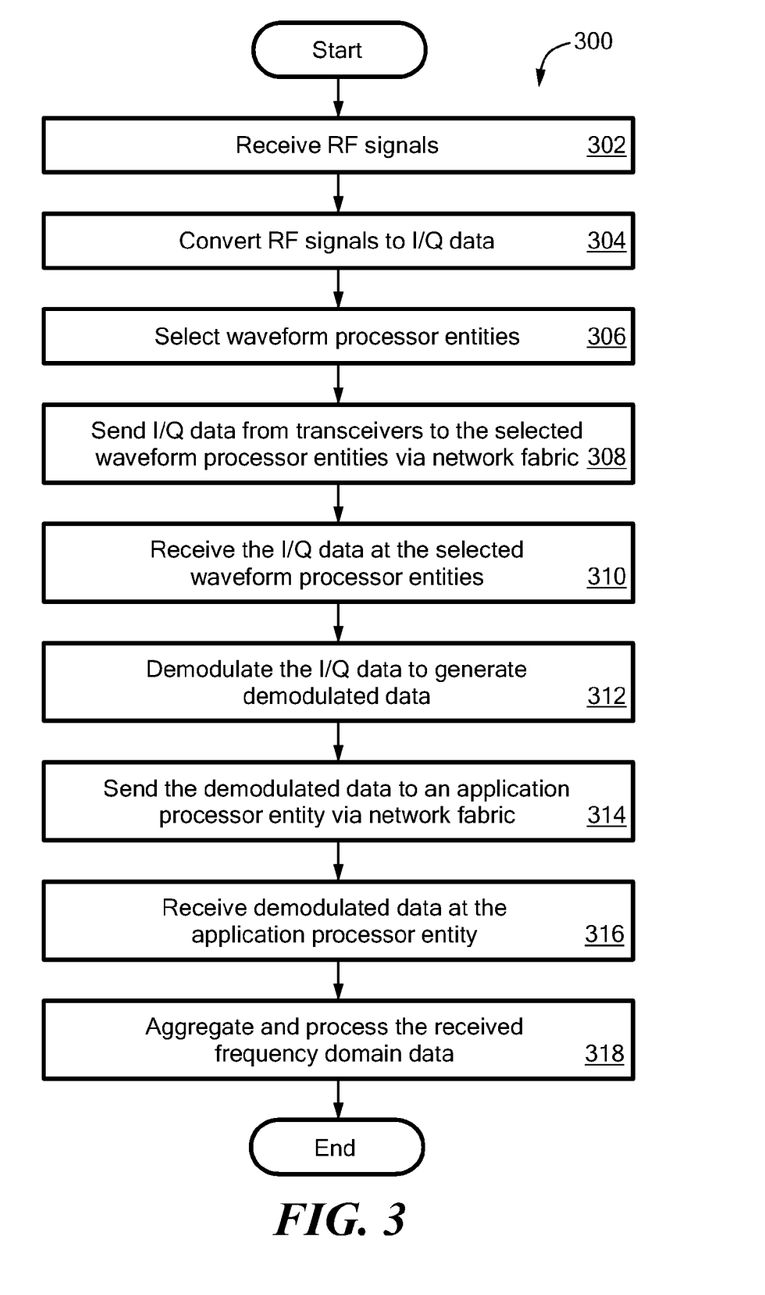
FIG. 3 is a flowchart showing an illustrative method for use within the system of FIG. 1.

FIG. 3 is a flowchart corresponding to the below contemplated technique which would be implemented in a communications system (such as the illustrative system 100 of FIG. 1). Rectangular elements (typified by element 302), herein denoted "processing blocks," represent computer software instructions or groups of instructions. The flow diagram does not depict the syntax of any particular programming language. Rather, the flow diagram illustrates the functional information one of ordinary skill in the art requires to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the systems and techniques sought to be protected herein. Thus, unless otherwise stated the blocks described below are unordered meaning that, when possible, the functions represented by the blocks can be performed in any convenient or desirable order.

At block 302, RF signals are received (e.g., from free space). At block 304, the RF signals are converted to I/Q data using any techniques described hereinabove. At block 306, one or more of a plurality of application processor entities are selected to process the I/Q data. This selection processing may utilize grid-computing techniques known in the art. At block 308, the I/Q data is sent to the selected waveform processor entities via a network fabric. In embodiments, the method 300 further comprises generating Ethernet packets comprising the I/Q data, and sending the Ethernet packets into the network fabric (i.e., into an Ethernet Fabric network). It should be appreciated that blocks 302-308 may correspond to processing within a transceiver 102 (FIG. 1).

At block 310, the I/Q data is received at the selected waveform processor entities via the network fabric. At block 312, the received I/Q data is demodulated using any desired waveform processing technique to generate demodulated data. At block 314, the demodulated data is sent to an application processor entity via the network fabric. In some embodiments, the method 300 further comprises storing I/Q data and/or demodulated data to a network storage device. In embodiments, the application process entity is one of a plurality of application processor entities and the method further comprises selecting one or more application processor entities to receive and process the demodulated data. It should be appreciated that blocks 310-314 may correspond to processing within a waveform processor entity 104 (FIG. 1).

At block 316, demodulated data is received at the application processor entity (or selected one of a plurality of application processor entities) via the network fabric. The application processor entity may receive any combination of demodulated data sent by the selected waveform processor entities (e.g., all data from one waveform processor entities, a portion of data from multiple waveform processor entities, etc.). At block 318, the received demodulated data is aggregated and, at block 318, digital signal processing techniques are applied to the aggregated data. In some embodiments, the illustrative method 300 further comprises correlating the demodulated data in time to perform wideband signal processing (e.g., spread spectrum). It should be appreciated that blocks 316, 318 may correspond to processing within an application processor entity 106 (FIG. 1).

Figure 4:
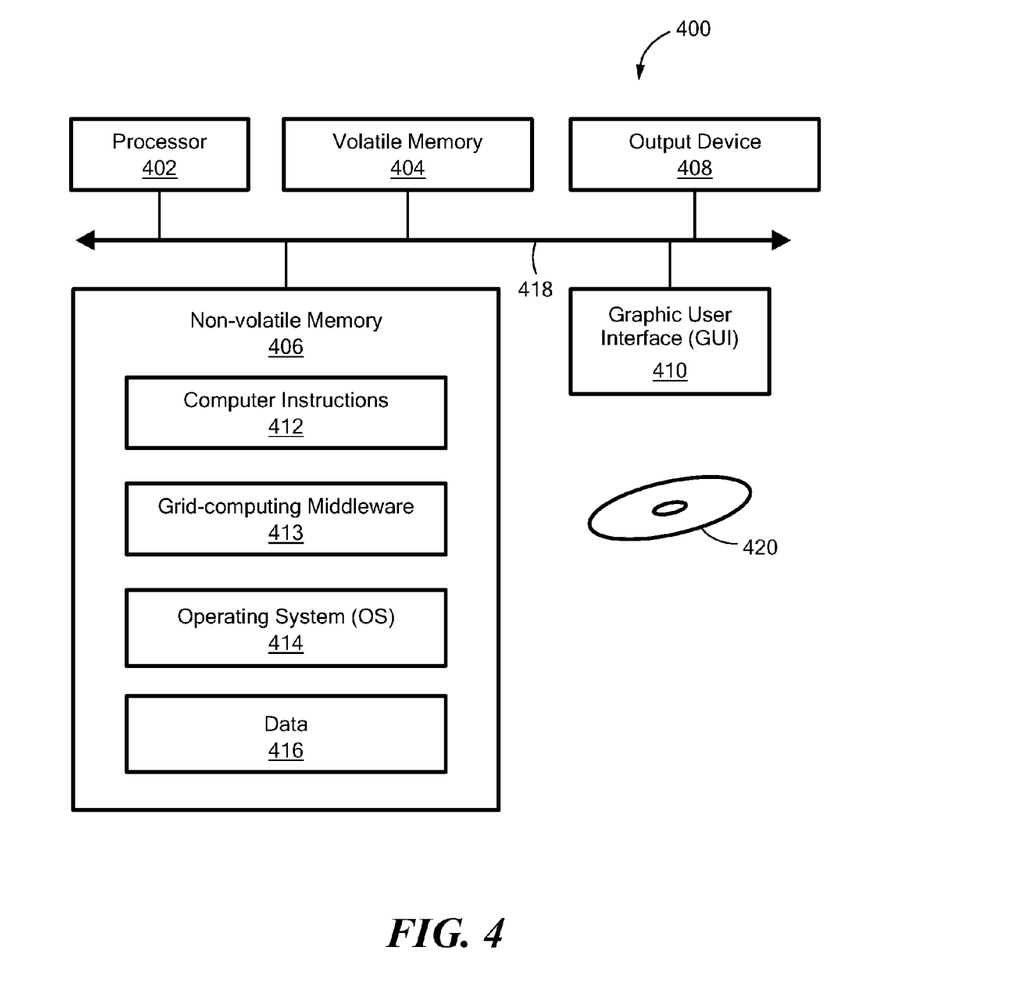
FIG. 4 is a schematic representation of an illustrative computer for use with the systems and method of FIGS. 1-3.

FIG. 4 shows an illustrative computer or other processing device 400 that can perform at least part of the processing described herein. The computer 400 includes a processor 402, a volatile memory 404, a non-volatile memory 406 (e.g., hard disk), an output device 408 and a graphical user interface (GUI) 410 (e.g., a mouse, a keyboard, a display, for example), each of which is coupled together by a bus 418. The non-volatile memory 406 stores computer instructions 412, an operating system 414, and data 416. In one example, the computer instructions 412 are executed by the processor 402 out of volatile memory 404. In one embodiment, an article 420 comprises non-transitory computer-readable instructions.

In embodiments, the computer 400 can perform at least part of the processing within one or more components of the communications system 100 (FIG. 1). Thus, the non-volatile memory 406 may also store grid-computing software 413 executable by the processor 402, as shown.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA and/or an ASIC).

All references cited herein are hereby incorporated herein by reference in their entirety.

Having described certain embodiments, which serve to illustrate the various concepts, structures, and techniques sought to be protected herein, it will now become apparent to those of ordinary skill in the art that other embodiments incorporating these concepts, structures, and techniques may be used. Accordingly, it is submitted that that scope of the patent should not be limited to the described embodiments but rather should be limited only by the spirit and scope of the following claims.

What is claimed is:

1. A radio frequency (RF) communications system comprising:
    a plurality of transceivers to receive RF signals and to convert the RF signals to digital in-phase and quadrature (I/Q) data representative of the received RF signals;
    a plurality of waveform processor entities operatively coupled to receive the I/Q data from the plurality of transceivers via a network fabric and to demodulate the received I/Q data to generate demodulated data;
    an application processor entity operatively coupled to receive at least a portion of the demodulated data from two or more of the plurality of waveform processor entities, to aggregate the received demodulated data, and to perform signal processing on the aggregated demodulated data; and
    cluster computer software to determine which of the plurality of waveform processor entities receives and processes the I/Q data.

2. The system of claim 1 further comprising a network storage device, wherein one or more of the plurality of waveform processor entities send the demodulated data to the network storage device, and wherein the application processor entity receives at least a portion of the demodulated data from the network storage device.

3. The system of claim 1 further comprising a plurality of application processor entities, the computer cluster software further to determine which of the plurality of application processor entities receives and processes the demodulated data.

4. The system of claim 1 further comprising a time synchronization server operatively coupled to synchronize clocks within the plurality of transceivers and clocks within of the plurality of waveform processor entities.

5. The system of claim 4 wherein the time synchronization server comprises a Global Positioning System (GPS)-based time synchronization module or a rubidium standard clock.

6. The system of claim 1 wherein the application processor entity correlates the demodulated data in time to perform wideband signal processing.

7. The system of claim 1 wherein a first one of the plurality of transceivers receives RF signals in a first band, a second one of the plurality of transceivers receives RF signals in a second band, wherein the application processor entity aggregates data representative of RF signals received in the first band and data representative of RF signal received in the second band to process a spread spectrum signal.

8. The system of claim 1 wherein the network fabric comprises an Ethernet Fabric network, the plurality of transceivers further to generate Ethernet packets comprising the I/Q data.

9. The system of claim 1 wherein the plurality of transceivers and the plurality of waveform processor entities are disposed upon a common substrate.

10. A method comprising:
    receiving RF signals at a plurality of transceivers;
    converting the RF signals to digital in-phase and quadrature (I/Q) data representative of the received RF signals;
    selecting, using cluster computer software, one or more of a plurality of waveform processor entities to perform digital signal processing on the I/Q data;
    sending the I/Q data from the plurality of transceivers to the selected one or more waveform processor entities via a network fabric;

receiving the I/Q data at the selected waveform processor entities;

demodulating the received I/Q data to generate demodulated data;

sending the demodulated data from the selected waveform processor entities to an application processor entity via the network fabric;

receiving, at the application processor entity, at least a portion of the demodulated data generated by two or more of the selected waveform processor entities;

aggregating the received demodulated data; and performing signal processing on the aggregated demodulated data.

11. The method of claim 10 further comprising:

sending the demodulated data from the selected waveform processor entities to a network storage device via the network fabric; and receiving, at the application processor entity, at least a portion of the demodulated data from the network storage device via the network fabric.

12. The method of claim 10 further comprising selecting the application processor entity from a plurality of application processor entities.

13. The method of claim 10 further comprising synchronizing clocks within the plurality of transceivers and clocks within the plurality of waveform processor entities.

14. The method of claim 10 wherein the application processor entity correlates the demodulated data in time to perform wideband signal processing.

15. The method of claim 10 further comprising:

receiving RF signals in a first band at a first one of the plurality of transceivers;

receiving RF signals in a second band at a second one of the plurality of transceivers; and aggregating, at the application processor entity, data representative of RF signals received in the first band and data representative of RF signal received in the second band to process a spread spectrum signal.

16. The method of claim 10 wherein the network fabric comprises an Ethernet Fabric network, the method further comprising sending Ethernet packets comprising the I/Q data from the plurality of transceivers to the selected waveform processor entities via a network fabric.

17. The method of claim 10 wherein the plurality of transceivers and the plurality of waveform processor entities are disposed upon a common substrate.

18. A radio frequency (RF) communications system comprising:

a plurality of receiver means for receiving RF signals and converting the RF signals to digital in-phase and quadrature (I/Q) data representative of the received RF signals;

a plurality of waveform processor means for receiving the I/Q data from the plurality of receiver means via a network fabric and for demodulating the received I/Q data to generate demodulated data;

an application processor means operatively coupled to receive at least a portion of the demodulated data from two or more of the plurality of waveform processor means, to aggregate the received demodulated data, and to perform signal processing on the aggregated demodulated data; and cluster computer software for determining which of the plurality of waveform processor means receives and processes the I/Q data.

19. The system of claim 18 further comprising a network storage means, wherein one or more of the plurality of waveform processor means send the demodulated data to the network storage means, and wherein the application processor means receives at least a portion of the demodulated data from the network storage means.

20. The system of claim 18 further comprising a plurality of application processor means, the grid-computing means further to determine which of the plurality of application processor means receives and processes the demodulated data.

* * * * *